(12) United States Patent
Shao et al.

(10) Patent No.: US 12,273,485 B2
(45) Date of Patent: Apr. 8, 2025

(54) METHODS AND INTERNET OF THINGS SYSTEMS FOR GAS OPERATION BASED ON CALL CENTERS OF SMART GAS

(71) Applicant: CHENGDU QINCHUAN IOT TECHNOLOGY CO., LTD., Sichuan (CN)

(72) Inventors: Zehua Shao, Chengdu (CN); Junyan Zhou, Chengdu (CN); Yuefei Wu, Chengdu (CN); Yaqiang Quan, Chengdu (CN); Guanghua Huang, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 195 days.

(21) Appl. No.: 18/297,017

(22) Filed: Apr. 7, 2023

(65) Prior Publication Data
US 2023/0247138 A1 Aug. 3, 2023

(30) Foreign Application Priority Data
Mar. 6, 2023 (CN) .......................... 202310202206.1

(51) Int. Cl.
H04M 3/51 (2006.01)
G16Y 10/35 (2020.01)
G16Y 40/35 (2020.01)

(52) U.S. Cl.
CPC ........... *H04M 3/5183* (2013.01); *G16Y 10/35* (2020.01); *G16Y 40/35* (2020.01)

(58) Field of Classification Search
CPC ...... H04M 3/5183; G16Y 10/35; G16Y 40/35
USPC .... 379/265.09, 265.02, 265.01, 242, 265.05, 379/265.11, 265.13, 266.01
See application file for complete search history.

(56) References Cited

U.S. PATENT DOCUMENTS 10,714,974 B2 * 7/2020 Clifton .................. H02J 3/14
2017/0251347 A1 * 8/2017 Mehta .................. H04W 4/08

FOREIGN PATENT DOCUMENTS

CN 110175788 A 8/2019

\* cited by examiner

Primary Examiner — Thjuan K Addy
(74) Attorney, Agent, or Firm — METIS IP LLC

(57) ABSTRACT

The present disclosure provides methods and Internet of Things systems for gas operation based on a call center of smart gas. The method includes: obtaining call data of a gas user of a call center; predicting demand information of different types of users based on the call data of the gas user, respectively, the demand information at least including a gas product demand and a gas service demand; and determining a gas operation push feature and pushing the gas operation push feature based on the demand information of the different types of users, the gas operation push feature including a push type feature and a push content feature.

20 Claims, 6 Drawing Sheets

METHODS AND INTERNET OF THINGS SYSTEMS FOR GAS OPERATION BASED ON CALL CENTERS OF SMART GAS

CROSS-REFERENCE TO RELATED APPLICATIONS

This application claims priority of Chinese Patent Application No. 202310202206.1, filed on Mar. 6, 2023, the entire contents of which are hereby incorporated by reference.

TECHNICAL FIELD

The present disclosure relates to the field of gas operation, and in particular, to methods and Internet of Things systems for gas operation based on a call center of smart gas.

BACKGROUND

Currently, with the rapid development of a gas industry, gas companies are facing more and more complex customer groups, gas application scenarios are becoming more and more diversified, and gas smart operation is gradually promoted, implemented and applied. Gas call centers are a key part of obtaining customer demand and providing gas services. The purpose of gas operation is to improve customer satisfaction with gas usage, so how to improve the efficiency of gas problem solving through the gas call centers is an urgent technical problem in this field.

In view of this, CN113283915A discloses a method, a system, a terminal, and a storage medium for processing a gas call center business, which can improve the efficiency in solving a gas problem for a user by obtaining the user demand through a client online and matching specialized business personnel to solve the user demand problem online, but does not involve aspects such as predicting the user demand and making a targeted push.

Accordingly, there is a need to provide methods and Internet of Things systems for gas operation based on a call center of smart gas that accurately predicts or determines the user demand based on limited customer data of the call center so as to improve efficiency of the gas operation, satisfy the user demand in time and adequately, and improve user satisfaction.

SUMMARY

One or more embodiments of the present disclosure provide a method for gas operation based on a call center of smart gas. The method is implemented by a smart gas management platform of an Internet of Things system for gas operation based on a call center of smart gas, comprising: obtaining call data of a gas user of a call center; predicting demand information of different types of users based on the call data of the gas user, respectively, the demand information at least including a gas product demand and a gas service demand; and determining a gas operation push feature and pushing the gas operation push feature based on the demand information of the different types of users, the gas operation push feature including a push type feature and a push content feature.

One or more embodiments of the present disclosure provide an Internet of Things system for gas operation based on a call center of smart gas. The Internet of Things system includes a smart gas user platform, a smart gas service platform, the smart gas management platform, a smart gas sensing network platform, and a smart gas object platform. The Internet of Things system is used to: obtain call data of a gas user of a call center; predict demand information of different types of users based on the call data of the gas user, respectively, the demand information at least including a gas product demand and a gas service demand; and determine a gas operation push feature and push the gas operation push feature based on the demand information of the different types of users, the gas operation push feature including a push type feature and a push content feature.

One or more embodiments of the present disclosure provide a non-transitory computer-readable storage medium storing computer instructions. When the computer instructions are executed by a processor, the method for gas operation based on a call center of smart gas is implemented.

BRIEF DESCRIPTION OF THE DRAWINGS

The present disclosure is further illustrated in terms of exemplary embodiments. These exemplary embodiments are described in detail with reference to the drawings. These embodiments are non-limiting exemplary embodiments, in which like reference numerals represent similar structures, wherein.

DETAILED DESCRIPTION

Figure 1:
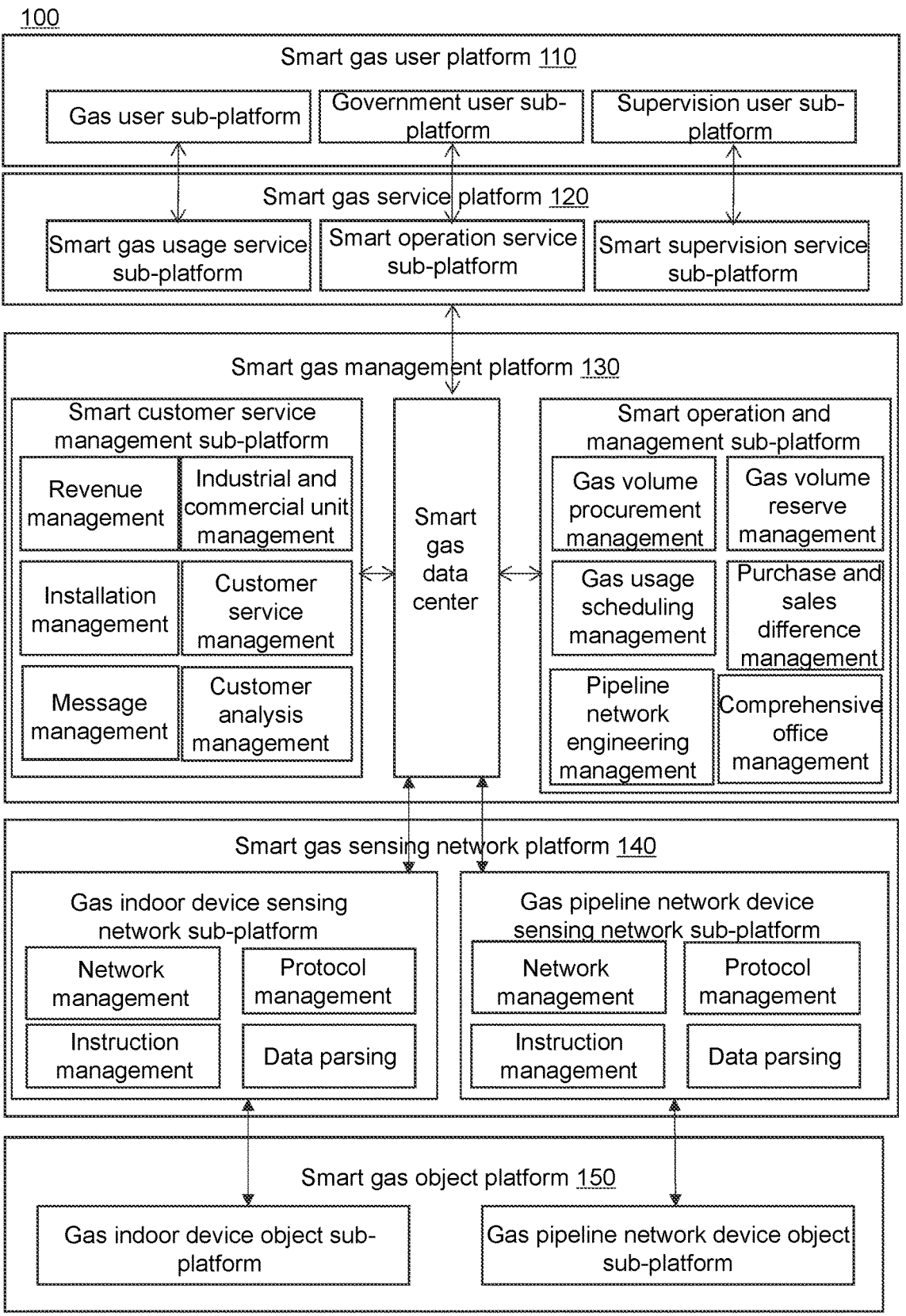
FIG. 1 is a platform structure diagram illustrating an exemplary Internet of Things system for gas operation based on a call center of smart gas according to some embodiments of the present disclosure.

In order to more clearly illustrate the technical solutions related to the embodiments of the present disclosure, a brief introduction of the drawings referred to the description of the embodiments is provided below. Obviously, the drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

It should be understood that the "system," "device," "unit," and/or "module" used herein are one method to distinguish different components, elements, parts, sections, or assemblies of different levels. However, if other words can achieve the same purpose, the words can be replaced by other expressions.

As used in the disclosure and the appended claims, the singular forms "a," "an," and "the" include plural referents unless the content clearly dictates otherwise; the plural forms may be intended to include singular forms as well. In general, the terms "comprise," "comprises," and/or "comprising," "include," "includes," and/or "including," merely prompt to include steps and elements that have been clearly identified, and these steps and elements do not constitute an exclusive listing. The methods or devices may also include other steps or elements.

The flowcharts used in the present disclosure illustrate operations that the system implements according to the embodiment of the present disclosure. It should be understood that the foregoing or following operations may not necessarily be performed exactly in order. Instead, the operations may be processed in reverse order or simultaneously. Besides, one or more other operations may be added to these processes, or one or more operations may be removed from these processes.

Gas as energy source has been widely used in factories, homes etc., and a large increase of gas users has brought about numerous gas demands, which in turn has led to a problem of inefficiency in solving a gas business. CN113283915A only identifies a business type for a business demand reported by a user by a client and matches specialized business personnel for processing, and does not consider a potential demand of the gas user. Therefore, in some embodiments of the present disclosure, demand information of different types of users is predicted respectively based on call data of the gas user, a gas operation push feature is determined and pushed, quantity demanded information is predicted, and a stocking scheme is determined through a call center, which is conducive to reasonably and accurately predicting or determining the user demand and improving the gas operation efficiency in a more forward-looking manner.

FIG. 1 is a platform structure diagram illustrating an exemplary Internet of Things system for gas operation based on a call center of smart gas according to some embodiments of the present disclosure.

In some embodiments, the Internet of Things system 100 for gas operation based on a call center of smart gas may be applied to a gas operation management system and used to perform a method for gas operation based on a call center of smart gas.

As shown in FIG. 1, the Internet of Things system 100 for gas operation based on a call center of smart gas may include: a smart gas user platform 110, a smart gas service platform 120, a smart gas management platform 130, a smart gas sensing network platform 140, and a smart gas object platform 150.

The smart gas user platform 110 is a user-driven platform. In some embodiments, the smart gas user platform 110 is configured as a terminal device (e.g., a mobile phone, a tablet computer, etc.). In some embodiments, the smart gas user platform 110 includes a gas user sub-platform, a government user sub-platform, and a supervision user sub-platform for providing services to a gas user based on a demand of the gas user. In some embodiments, the gas user sub-platform provides data related to gas usage and a solution to a gas problem, etc. for the gas user; the government user sub-platform provides data related to gas operation for a government user; and the supervision user sub-platform supervises the operation of the entire Internet of Things system for a supervision user.

In some embodiments, the smart gas user platform 110 may interact with the smart gas service platform 120 downwardly. In some embodiments, the gas user sub-platform corresponds and interacts with a smart gas usage service sub-platform to obtain a service of safety gas usage; the government user sub-platform corresponds and interacts with a smart operation service sub-platform to obtain a service of gas operation; and the supervision user sub-platform corresponds and interacts with a smart supervision service sub-platform to obtain a service of safety supervision demand. For example, sending call information of the gas user to the smart gas usage service sub-platform, or receiving customer service feedback information uploaded by the smart gas usage service sub-platform; sending a gas operation and management information query instruction to the smart operation service sub-platform, or receiving gas maintenance and management information uploaded by the smart operation service sub-platform.

The smart gas service platform 120 includes a smart gas usage service sub-platform, a smart operation service sub-platform, and a smart supervision service sub-platform. In some embodiments, the smart gas usage service sub-platform corresponds to the gas user sub-platform to provide the gas user with information related to a gas device; the smart operation service sub-platform corresponds to the government user sub-platform to provide the government user with information related to gas operation; and the smart supervision service sub-platform corresponds to the supervision user sub-platform to provide the supervision user with information related to safety supervision.

In some embodiments, the smart gas service platform 120 interacts downwardly with the smart gas management platform 130. For example, sending the gas operation and management information query instruction to the smart gas data center, or receiving the operation and management information uploaded by the smart gas data center. The smart gas service platform 120 may also interact upwardly with the smart gas user platform 110. For example, receiving the operation and management information query instruction sent by the government user sub-platform, or uploading the operation and management information to the government user sub-platform.

The smart gas management platform 130 is a platform for performing mart gas operation and management, including a smart customer service management sub-platform, a smart gas data center, and a smart operation and management sub-platform. Information interaction with the upper smart gas service platform 120 and the lower smart gas sensing network platform 140 is through the smart gas data center. Both the smart customer service management sub-platform and the smart operation and management sub-platform interact with the smart gas data center in both directions.

The smart customer service management sub-platform includes a revenue management, an industrial and commercial unit management, an installment management, a customer service management, a message management, and a customer analysis management. The customer service management module is used to analyze and reply to customer feedback information; the information management module is used to view information such as a customer call, a consultation, feedback, a complaint, etc., and the information may be sent to the customer service management module for corresponding reply processing; the customer analysis management module is used to view a customer feedback record such as a customer consultation, a complaint, a report, an evaluation, etc., information related to the customer such as gas usage, device maintenance, etc., and generate a customer analysis report.

The smart operation management sub-platform includes a gas volume procurement management, a gas volume reserve management, a gas usage scheduling management, a purchase and sales difference management, a pipeline network engineering management, and a comprehensive office management. The comprehensive office management module is used to coordinate the operation of affairs of human resources, public resources, gas devices, daily office, administrative management.

In some embodiments, the smart gas management platform 130 interacts downwardly with the smart gas sensing network platform 140. For example, sending an instruction for obtaining data related to a gas device to the smart gas sensing network platform, or receiving the data related to the gas device uploaded by the smart gas sensing network platform.

In some embodiments, the smart gas management platform 130 interacts upwardly with the smart gas service platform 120. For example, receiving the gas operation and management information query instruction sent by the smart gas service platform, or uploading the gas operation and management information to the smart gas service platform.

In some embodiments, the Internet of Things system for gas operation further includes the smart gas sensing network platform 140. The smart gas sensing network platform 140 includes a gas indoor device sensing network sub-platform and a gas pipeline network device sensing network sub-platform. Both the gas indoor device sensing network sub-platform and the gas pipeline network device sensing network sub-platform include a network management, a protocol management, an instruction management, and a data parsing. The gas indoor device sensing network sub-platform corresponds to a gas indoor device object sub-platform and is used to obtain data related to an indoor device, and the gas pipeline network device sensing network sub-platform corresponds to a gas pipeline network device object sub-platform and is used to obtain data related to a pipeline network device. In some embodiments, the sensing network platform may be configured as a communication network and a gateway.

In some embodiments, the smart gas sensing network platform 140 may interact downwardly with the smart gas object platform 150. For example, receiving the data related to the gas device uploaded by the smart gas object platform and sending the instruction for obtaining the data related to the gas device to the smart gas object platform. The smart gas sensing network platform 140 may also interact with the smart gas management platform 130 upwardly. For example, receiving the instruction for obtaining the data related to the gas device sent by the smart gas data center, and uploading the data related to the gas device to the smart gas data center.

In some embodiments, the Internet of Things system for gas operation further includes the smart gas object platform 150. The smart gas object platform 150 includes the gas indoor device object sub-platform and the gas pipeline network device object sub-platform. The gas indoor device object sub-platform corresponds to the gas indoor device sensing network sub-platform, and the data related to the indoor device is uploaded to the smart gas data center through the gas indoor device sensing network sub-platform. The gas pipeline network device object sub-platform corresponds to a gas pipeline network device sensing network sub-platform, and the data related to the pipeline network device is uploaded to the smart gas data center through the gas pipeline network device sensing network sub-platform.

In some embodiments, the smart gas object platform 150 may interact with the smart gas sensing network platform 140 upwardly. For example, receiving the instruction for obtaining the data related to the gas device sent by the smart gas sensing network platform and uploading the data related to the gas device to the smart gas sensing network platform.

It should be noted that the above description of the Internet of Things system for gas operation based on a call center of smart gas and internal modules thereof is merely for convenience of illustration and not intended to limit the present disclosure to the scope of the illustrated embodiments. It can be understood that for those skilled in the art, after understanding the principle of the system, it may be possible to combine various modules or form a sub-system to connect with other modules without departing from the principle. In some embodiments, the smart gas user platform 110, the smart gas service platform 120, the smart gas management platform 130, the smart gas sensing network platform 140, and the smart gas object platform 150 disclosed in FIG. 1 may be different modules in a single system, or one module implementing the functions of the two or more modules. For example, each module may share a common storage module, and each module may also have its own storage module. Such variations are within the scope of protection of the present disclosure.

Figure 2:
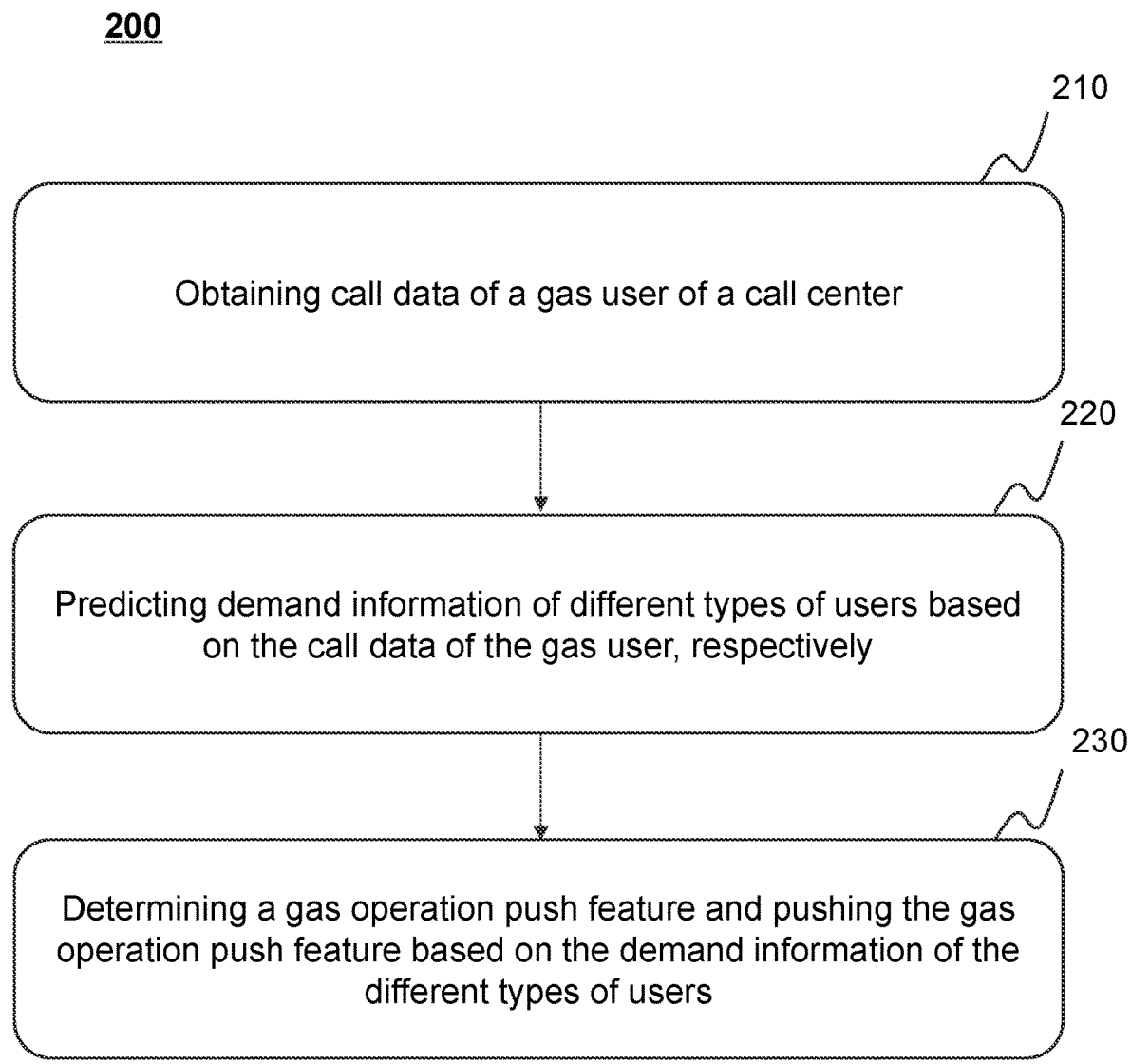
FIG. 2 is a flowchart illustrating an exemplary process of a method for gas operation based on a call center of smart gas according to some embodiments of the present disclosure.

FIG. 2 is a flowchart illustrating an exemplary process of a method for gas operation based on a call center of smart gas according to some embodiments of the present disclosure. In some embodiments, process 200 may be performed by the smart gas management platform.

As shown in FIG. 2, the process 200 includes the following operations.

In step 210, obtaining call data of a gas user of a call center.

The call center may refer to a customer service center for processing a telephone query from a customer and being able to record and store all call information. For example, the customer may make a call to a gas call center, and the gas call center answers and processes the call and stores the call information.

In some embodiments, the gas user may refer to a consumer who uses gas, including an industrial gas user, a commercial gas user, a general gas user, etc.

In some embodiments, the call data refers to call information of the gas user, and the call data may be classified into various types. The classification type include a complaint, a repair, a consultation, an order for gas, etc. For example, a consultation about a gas conversion-related problem, a complaint about impure gas, etc.

In some embodiments, the smart gas management platform obtains the call data of the gas user of the call center via the smart gas data center.

In step 220, predicting demand information of different types of users based on the call data of the gas user, respectively.

In some embodiments, the different types of users refers to different types of gas users. According to different gas demands, the gas users may be divided into various types, for example, the industrial gas user, the commercial gas user, the general gas user, etc.

The demand information may reflect a gas product demand and a gas service demand. The gas product demand refers to a product demand related to gas or a gas device, for example, a demand for ordering gas, a demand for purchasing a gas water heater, etc. The gas service demand refers to a service demand related to gas or a gas device, for example, a demand for a gas conversion service, a demand for replacing a gas pipeline, etc.

In some embodiments, the demand information varies for the different types of users. For example, the general gas user has the demand for ordering gas; the industrial gas user has a high calorific value gas demand; the commercial gas user has a gas pipeline replacement demand, etc.

In some embodiments, the demand information may be predicted based on historical data by correlating users of a same type, users with similar features, and users in a same region. The historical data includes historical demand information. The smart gas management platform may perform a targeted prediction of demand information based on the historical demand information of each type of user of the different types of users. For example, if a proportion of the demand for ordering gas in the historical demand information of the general gas users in a residential community is relatively large, it may be predicted that a probability that the demand information of the gas users in the community is the demand for ordering gas is relatively large; if a proportion of the high calorific gas demand in the historical demand information of the gas users in a chemical industry is relatively large, it may be predicted that a probability that the demand information of the chemical industry is the high-calorific gas demand is relatively large; If a proportion of the gas pipeline replacement demand in the historical demand information of the gas users in a commercial street snack bar is relatively large, it may be predicted that a probability that the demand information of the gas users in the commercial street area is the gas pipeline replacement demand is relatively large.

In some embodiments, demand matching degrees of the user for different demands may also be determined based on different types of call data of the gas user and the demand information of the different types of users may be predicted. For more descriptions about the type of the call data of the gas user and the demand matching degrees, please refer to FIG. 3 and its related description.

In step 230, determining a gas operation push feature and pushing the gas operation push feature based on the demand information of the different types of users.

The gas operation push feature refers to a feature of gas operation promotion and publicity and may include a push type feature and a push content feature. The push type feature refers to a push form, for example, a phone push, a door-to-door push, an email push, etc.; the push content feature refers to content of a push product or service, for example, pushing a gas stove, pushing a repair pipeline service, pushing high calorific value gas, etc.

In some embodiments, potential demands of different gas users may be determined based on the historical demand information of the different types of gas users according to types, gas usage habits of the gas users, regions in which the gas users are located, similarity of indoor devices, etc., so as to determine the gas operation push features for the different users.

In some embodiments, a gas user association graph may also be constructed based on the demand information of the different types of users so as to determine the gas operation push feature. For more descriptions about the gas user association graph, please refer to FIG. 5A, FIG. 5B, and their related descriptions.

In some embodiments of the present disclosure, the demand information of the different types of users is predicted through the call data of the gas user of the call center, respectively, and the gas operation push feature is determined for pushing, which is conducive to accurately predicting the user demand and timely providing the service.

It should be noted that the above description of the process 200 is merely for the purpose of example and illustration, and not intended to limit the scope of application of the present disclosure. Various amendments and changes can be made to the process 200 for those skilled in the art under the guidance of the present disclosure. However, these amendments and changes remain within the scope of the present disclosure.

Figure 3:
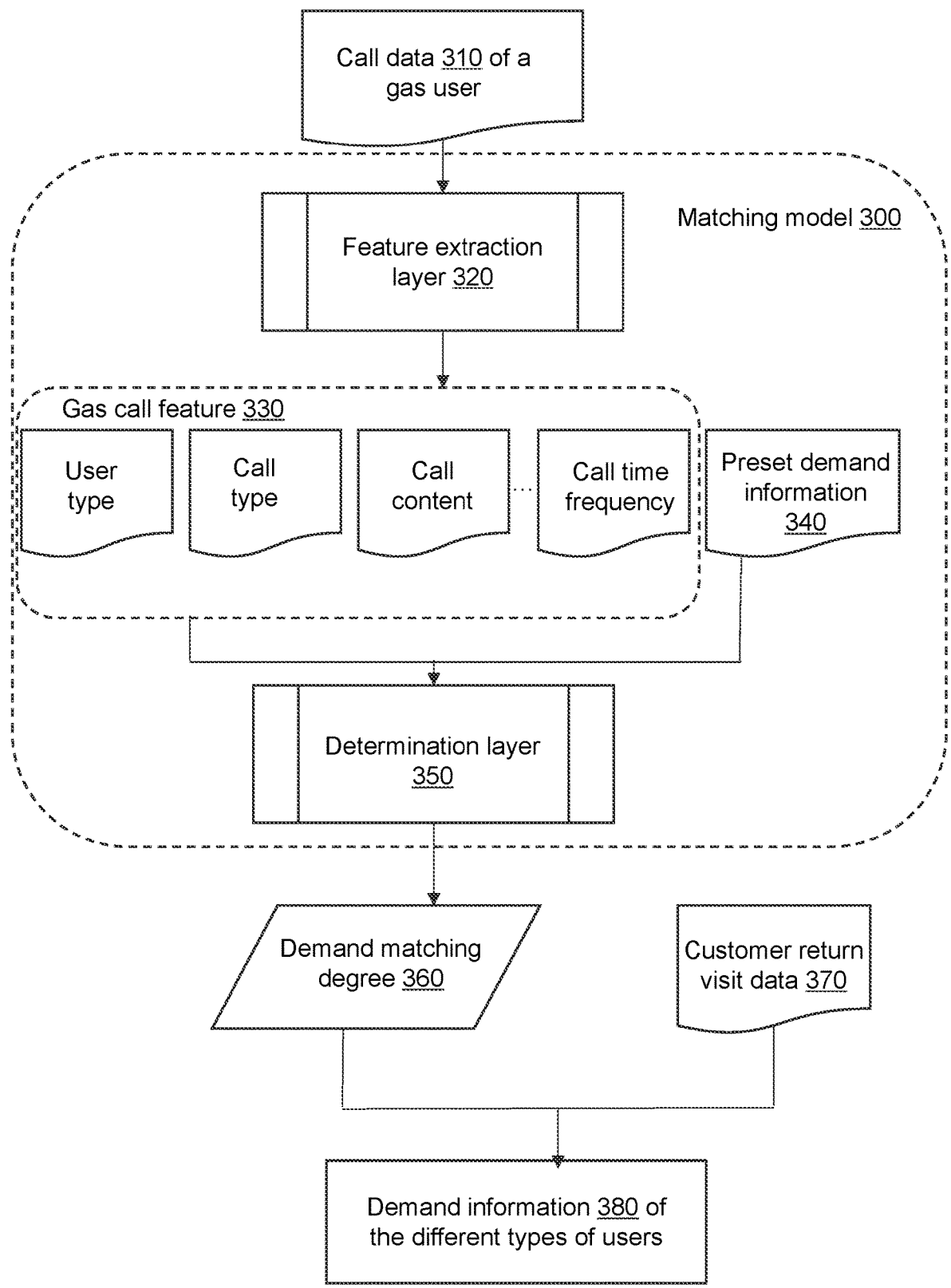
FIG. 3 is an exemplary schematic diagram illustrating predicting demand information according to some embodiments of the present disclosure.

FIG. 3 is an exemplary schematic diagram illustrating predicting demand information according to some embodiments of the present disclosure.

As shown in FIG. 3, a matching model 300 may include a feature extraction layer 320 and a determination layer 350.

In some embodiments, predicting the demand information of different types of users based on call data of the gas user, respectively includes: classifying the call data of the gas user; determining, based on different types of call data of the gas user, demand matching degrees of the gas user for different demands; and predicting the demand information of the different types of users based on the demand matching degrees.

In some embodiments, a smart gas management platform may classify the call data of the gas user according to a purpose of a call made by the gas user to the gas call center. For more descriptions about a classification type of the call data of the gas user, please refer to FIG. 2 and its related description.

In some embodiments, based on the different types of call data of the gas user, the demand matching degrees of the user for the different demands may be determined through a matching model, i.e., the demand matching degrees may be determined by processing the call data of the gas user corresponding to the different types of users using the matching model.

In some embodiments, the demand matching degree refers to a demand matching degree of a gas user for different preset demand information. The preset demand information may include various demand information, such as a gas stove purchase demand, a gas water heater purchase demand, a gas conversion service demand, a gas pipeline replacement demand, a high calorific value gas demand, a gas regulator or filter purchase demand. In some embodiments, the demand matching degree may be expressed as a percentage. The larger the percentage, the higher the demand matching degree.

In some embodiments, the matching model 300 includes the feature extraction layer 320 and the determination layer 350. In some embodiments, the matching model 300 refers to a machine learning model that determines the demand matching degree 360. In some embodiments, the matching model 300 may be a trained machine learning model. For example, the matching model 300 may include a neural network model, a convolutional neural network model, or other custom model structure, or the like, or any combination thereof.

In some embodiments, the feature extraction layer 320 may be used to obtain a gas call feature 330. The feature extraction layer 320 may be a machine learning model, for example, the feature extraction layer 320 may include a convolutional neural network model, a neural network model, etc. In some embodiments, an input of the feature extraction layer 320 may include the call data 310 of the gas user and an output may include the gas call feature 330. The gas call feature 330 may include a user type, a call type, call content, a call time frequency, etc. For example, the call content may include the user feeds back that a gas calorific value fluctuates greatly, the user feeds back that a pipeline leaks, etc.; the call type may include a complaint, a product consultation, a fault repair, etc.; and the call time frequency refers to a time frequency at which the gas user makes a call, for example, every five minutes. For more descriptions about the call data 310 of the gas user, please refer to FIG. 2 and its related description.

In some embodiments, the determination layer 350 may be used to determine the demand matching degrees 360 of the user for the different preset demand information. The determination layer 350 may be implemented by a machine learning model, such as a convolutional neural network model, a neural network model, etc.

In some embodiments, an input of the determination layer 350 may include the gas call feature 330 and the preset demand information 340. An output of the determination layer 350 may include the demand matching degrees 360 of the user for the different preset demand information. In some embodiments, when various preset demand information 340 is input at the same time, the demand matching degrees 360 may be arranged in a corresponding order of the preset demand information 340 and represented as a sequence. One element of the sequence corresponds to one type of preset demand information. For more descriptions about the demand information, please refer to FIG. 2 and its related description.

In some embodiments, the matching model may be determined by joint training of the feature extraction layer 320 and the determination layer 350. In some embodiments, a first training sample of the matching model may include a large amount of historical call data of the gas user and historical preset demand information. A label of the first training sample may include historical demand matching degrees of the gas user for the different preset demand information. In some embodiments, the first training sample and the first training label may be obtained based on historical data of the smart gas call center.

In some embodiments, the gas call feature 330 output by the feature extraction layer 320 may be used as the input of the determination layer 350. A process of the joint training may include: using the historical call data of the gas user in the first training sample as the input of the feature extraction layer 320; using the gas call feature 330 output by the feature extraction layer 320 as the input of the determination layer 350 to obtain the output of the determination layer 350; constructing a loss function using the demand matching degree 360 output by the determination layer 350 and the first training label; updating iteratively based on the loss function until a preset condition is satisfied, and obtaining a trained feature extraction layer and determination layer. The preset condition may include that the loss function is smaller than a threshold, converges, a training period reaches a threshold, etc.

In some embodiments, based on the different types of call data of the gas user, the demand matching degrees of the user for the different demands may be determined through historical experience. The demand matching degrees may be manually evaluated based on experience.

In some embodiments of the present disclosure, determining the demand matching degree through the matching model can more reasonably and accurately determine the demand matching degrees of the user for the different demands, which is conducive to improving the efficiency of gas operation.

In some embodiments, the predicting the demand information 380 of the different types of users based on the demand matching degrees 360 includes: determining at least one demand corresponding to the demand matching degree of the gas user meeting a preset condition; and in response to a determination that the at least one demand has customer return visit data 370 corresponding to the demand, predicting the demand information 380 of the different types of users in combination with the customer return visit data 370.

In some embodiments, the demand matching degree that meets the preset condition refers to a demand matching degree that ranks first after sorting demands in a descending order based on a magnitude of the demand matching degree, or demand matching degrees that rank top n and exceed a preset threshold. The preset threshold may be manually set, for example, 80%.

In some embodiments, users corresponding to demands of the demand matching degrees that rank top five and exceed 80% may be selected to determine whether there is the customer return visit data.

The customer return visit data refers to an evaluation feedback (e.g., a customer satisfaction, whether a problem is solved (partially solved, completely solved), a customer feedback) of a customer after receiving a service or using a product.

In some embodiments, the demands corresponding to the demand matching degrees that rank top five of gas users of a residential building are a gas ordering demand, a gas stove purchase demand, a gas water heater purchase demand, a filter replacement demand, and a gas pipeline replacement demand, with the demand matching degrees of 92%, 88%, 85%, 75%, and 60%, respectively. For example, the demands corresponding to the demand matching degrees that exceeds the preset threshold of 80% includes the gas stove purchase demand. According to the return visit data, it is found that several customers feedback that they are very dissatisfied with the purchased gas stove of model A, and the customers may choose to exchange, return, or purchase the gas stove from other channels, so it can be predicted that the purchase demand of the gas stove of model A may be relatively few in the near future.

In some embodiments, in response to a determination that the demand corresponding to the demand matching degree that meets the preset condition is a demand corresponding to the demand matching degree that ranks first, the demand information may be directly predicted and there is no need to combine the customer return visit data corresponding to the demand.

In some embodiments of the present disclosure, the demand corresponding to the demand matching degree of the gas user that meets the preset condition is determined and the demand information of the different types of users can be predicted more accurately in combination with the customer return visit data, which is conducive to improving user satisfaction.

In some embodiments of the present disclosure, the demand matching degree is determined by the matching model, and the demand information is predicted based on the demand matching degree, which can accurately predict the user demand and perform a targeted push.

Figure 4:
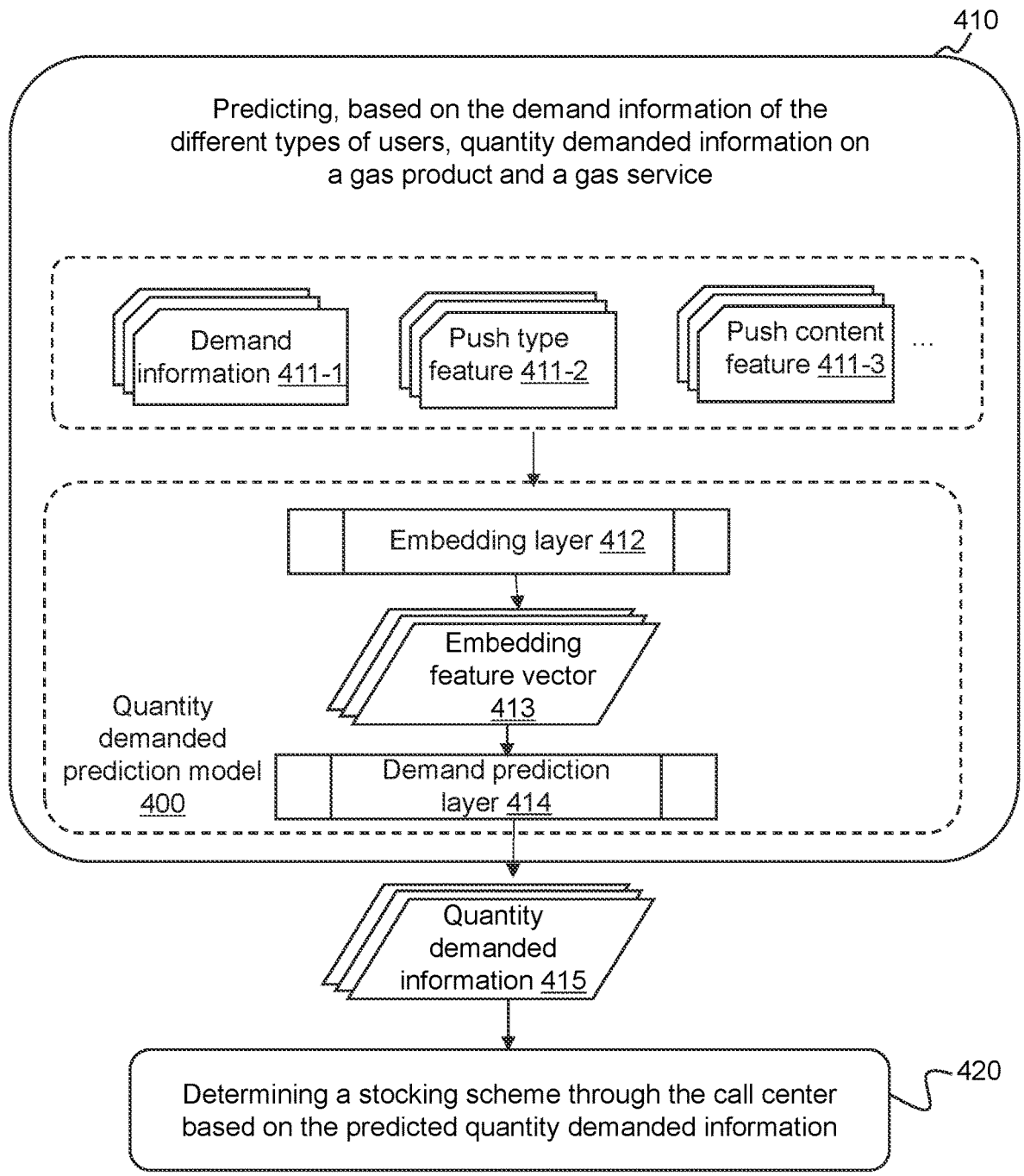
FIG. 4 is an exemplary schematic diagram illustrating determining a stocking scheme according to some embodiments of the present disclosure.

FIG. 4 is an exemplary schematic diagram illustrating determining a stocking scheme according to some embodiments of the present disclosure.

In some embodiments, a smart gas management platform may also determine the stocking scheme through a call center, including: predicting, based on the demand information of the different types of users, quantity demanded information on a gas product and a gas service; and determining the stocking scheme through the call center based on the predicted quantity demanded information.

The stocking scheme refers to a related scheme formulated by a gas company based on the predicted user quantity demanded information to stock a gas product in advance and improve a gas service level of gas service personnel, etc. For example, the stocking scheme may include stocking a specific product type and a certain count of products, etc. (e.g., preparing 10 gas stoves of a certain model, 20 gas regulators, etc.). As another example, the stocking scheme may also include a certain type of gas service training for the gas service personnel (e.g., training the gas service personnel in gas indoor pipeline maintenance, etc.), etc.

As shown in FIG. 4, the smart gas management platform may determine the stocking scheme based on the following operations.

In step 410, predicting, based on the demand information of the different types of users, quantity demanded information on a gas product and a gas service.

The gas product refers to a product associated with gas usage. For example, the gas product may include a gas stove, a gas water heater, a gas regulator, a gas filter, or the like.

The gas service refers to a service related to gas provided by the gas company to a user. For example, the gas service may include a gas product replacement service, a gas breakdown repair service, or the like.

The quantity demanded information refers to quantity demanded of the gas user for a type and count of gas products (e.g., 1 gas stove, 1 gas regulator, etc.) and for a type and count of gas services (e.g., 2 gas valve replacement services, 1 gas stove repair service, etc.). In some embodiments, the gas service demand may also be related to the gas product demand. For example, when providing the gas stove repair service to the user, a new gas stove may be required for replacement, etc.

In some embodiments, the smart gas management platform may predict the corresponding quantity demanded information based on the demand information of the different types of gas users. For example, when demand information of a residential gas user is to repair a gas stove, the smart gas management platform may determine that the quantity demanded information of the gas user is to repair the gas stove service 1 time. For example, if demand information of an industrial gas user is to replace a gas valve, the smart gas management platform may determine the quantity demanded information of the gas user is one gas valve replacement service and 10 gas valve products, etc.

In some embodiments, the prediction of the quantity demanded information may also be related to a demand matching degree. For example, when a gas stove demand matching degree is greater than a certain threshold (e.g., 90%, etc.), a user may be predicted to have a need to replace the gas stove, etc. For more descriptions about the demand matching degree, please refer to FIG. 3.

In some embodiments, the quantity demanded information is related to the demand matching degree, which can improve the accuracy of predicting the quantity demanded information and better meet a demand of the gas user for the gas product and the gas service.

In some embodiments, the quantity demanded information may also be predicted by processing the demand information of the different types of users and a gas operation push feature (including a push type feature and a push content feature) using a quantity demanded prediction model. The quantity demanded prediction model is a machine learning model. For example, the quantity demanded prediction model may be a neural network model, a deep neural network model, a recurrent neural network model, or the like, or any combination thereof. For more descriptions about the gas operation push feature, please refer to FIG. 2.

As shown in FIG. 4, the quantity demanded prediction model 400 may include an embedding layer 412 and a demand prediction layer 414.

The embedding layer 412 may be used to process the demand information of the different types of users and the gas operation push feature to obtain an embedding feature vector. In some embodiments, an input of the embedding layer 412 may include the demand information 411-1, the push type feature 411-2, and the push content feature 411-3, and an output may include the embedding feature vector 413. For more descriptions about the demand information, the push type feature, and the push content feature, please refer to FIG. 2.

The embedding feature vector 413 is a vectorized representation of a user demand, the push type feature, and the push content feature. For example, the embedding feature vector 413 may be represented as (x, y, z), where x represents the user demand, y represents the push type feature, and z represents the push content feature.

The demand prediction layer 414 may be used to determine the quantity demanded information of the gas user. In some embodiments, an input of the demand prediction layer 414 may include the embedding feature vector 413 and an output may include the quantity demanded information 415. The quantity demanded information refers to information related to the type and count of gas products demanded by the gas user, the type and count of gas services demanded by the gas user, etc. For example, the quantity demanded information may be that the gas user demands 1 gas water heater, 1 gas valve replacement service, etc. For more descriptions about the quantity demanded information, please refer to the above.

In some embodiments, the quantity demanded prediction model may be determined by joint training of the embedding layer and the demand prediction layer.

In some embodiments, a second training sample of the quantity demanded prediction model may include a plurality of sets of data and/or information such as historical demand information, a historical push type feature, and a historical push content feature corresponding to a large number of sample gas users. Each set of historical demand information, the historical push type feature, and the historical push content feature corresponds to one sample gas user. A label of the second training sample may include historical quantity demanded information of that sample gas user. In some embodiments, the second training sample and the label thereof may be obtained based on historical data of the smart gas call center. For more descriptions about the detailed training process of the quantity demanded prediction model, please refer to the training process of the matching model in FIG. 3.

In some embodiments, the smart gas management platform processes the demand information of the different types of users and the gas operation push feature through the quantity demanded prediction model to determine the quantity demanded information of the gas user, which can obtain a more accurate effect than the quantity demanded information of the gas user predicted manually, thereby improving efficiency and save human resources.

In step 420, determining a stocking scheme through the call center based on the predicted quantity demanded information.

In some embodiments, the smart gas management platform determines the stocking plan through the call center based on the demand information of the different types of gas users, which may predict in advance the user demand for the type and count of the gas product and provide the gas user with the corresponding product to better meet the user demand, enhance user satisfaction, and improve gas operation efficiency.

Figure 5A:
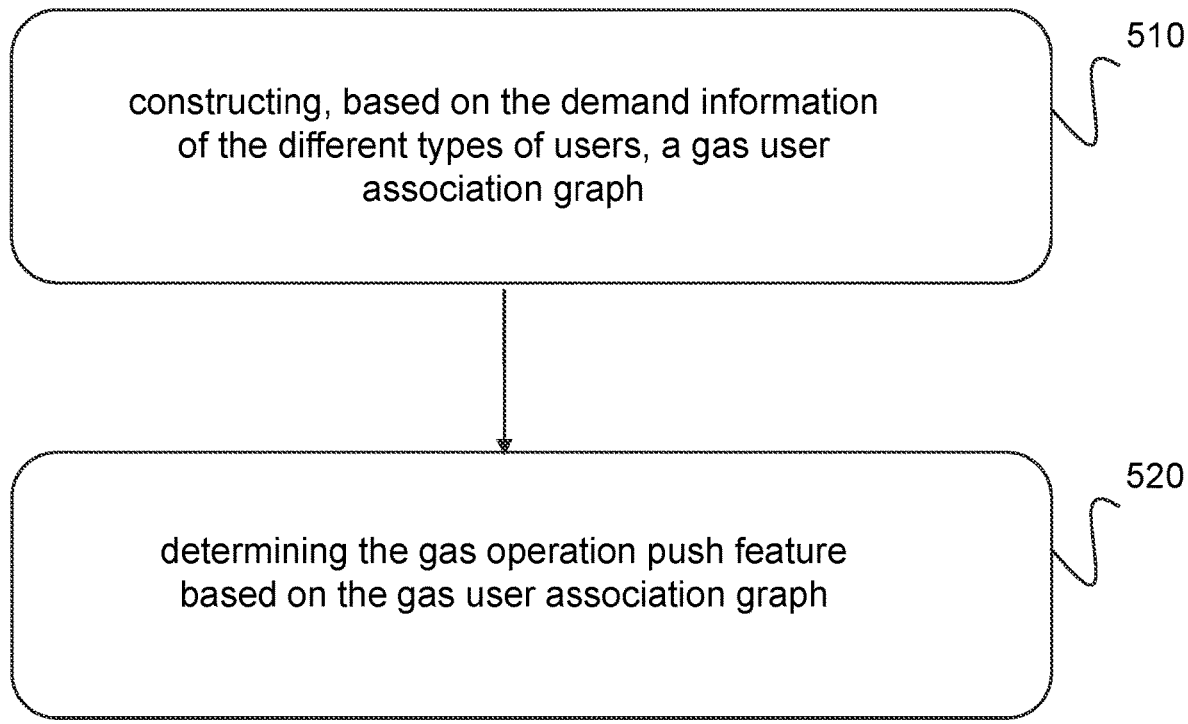
FIG. 5A is an exemplary schematic diagram illustrating determining a gas operation push feature according to some embodiments of the present disclosure.

FIG. 5A is an exemplary schematic diagram illustrating determining a gas operation push feature according to some embodiments of the present disclosure.

In some embodiments, the smart gas management platform may further determine the gas operation push feature based on the demand information of the different types of users, including: constructing, based on the demand information of the different types of users, a gas user association graph; and determining the gas operation push feature based on the gas user association graph. In some embodiments, the gas operation push feature may be determined based on the following operations.

In step 510, constructing, based on the demand information of the different types of users, the gas user association graph.

The gas user association graph may be used to reflect different gas users and an association relationship between the different gas users, for example, whether the different gas users are users of a same community, etc. In some embodiments, the gas user association graph may include a node and an edge.

Figure 5B:
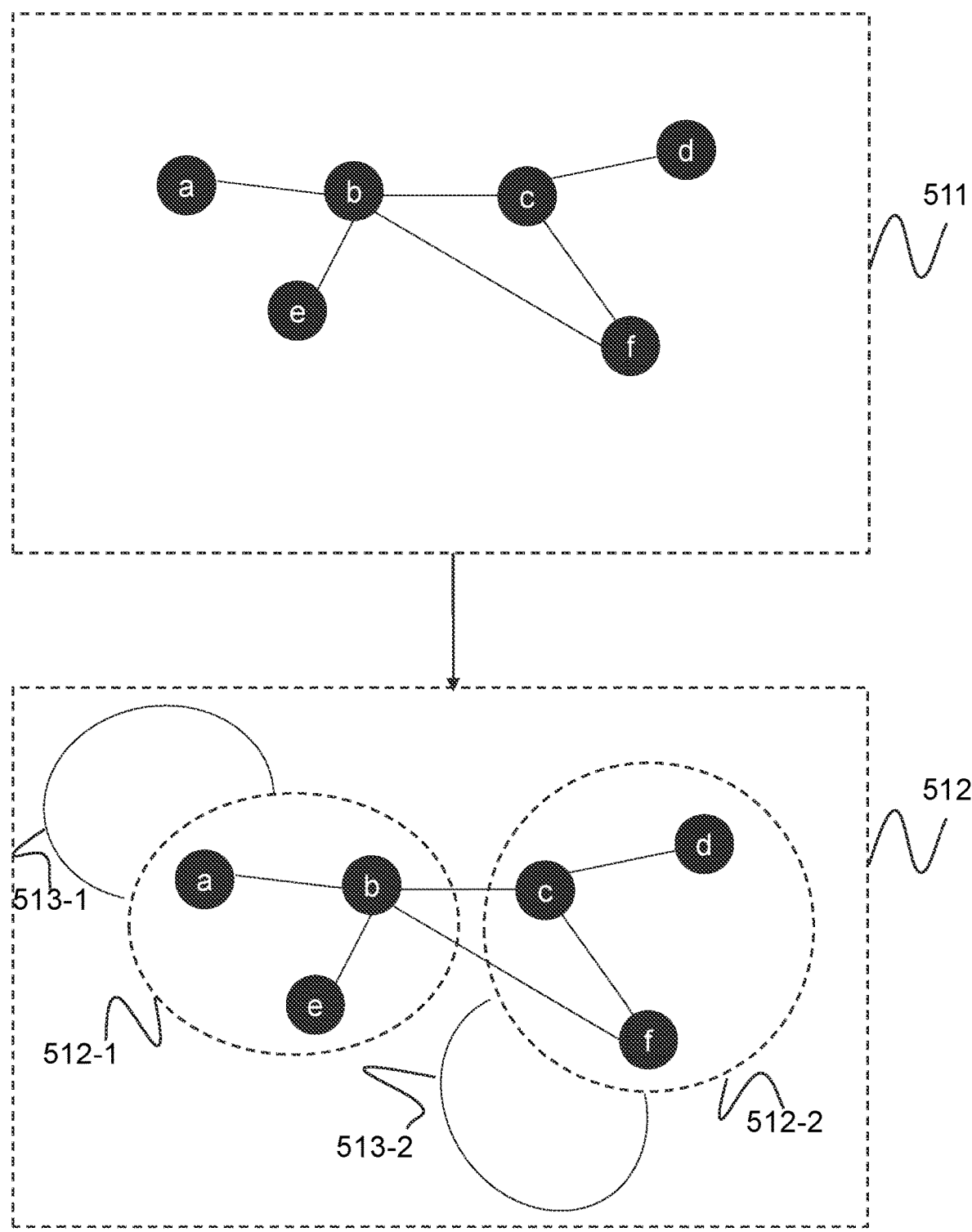
FIG. 5B is a schematic diagram illustrating an exemplary process for dividing one or more push community sub-regions.

In the exemplary schematic diagram of one or more push community sub-regions shown in FIG. 5B, a first gas user association graph 511 and a second gas user association graph 512 are included. The second gas user association graph 512 is generated by the first gas user association graph 511 after the operation of dividing the push community sub-regions. For more descriptions about the push community sub-regions and the division thereof, please refer to below.

In some embodiments, the nodes of the gas user association graph may reflect the different gas users. As shown in FIG. 5B, the first gas user association graph 511 includes node a, node b, node c, node d, node e, node f, etc. Each node may represent a gas user. For example, node a represents gas user a, node b represents gas user b, etc.

In some embodiments, a node feature may include the demand information of the gas user. For more descriptions about the demand information, please refer to FIG. 2.

In some embodiments, the node feature also includes a demand matching degree of the gas user for a gas product and a gas service. For more descriptions about the demand matching degree, please refer to FIG. 3.

In some embodiments, the node feature includes the demand matching degree, which can make the gas operation push feature determined subsequently more in line with the user demand and enhance user satisfaction.

In some embodiments, the node feature may also include customer return visit data. For more descriptions about the customer return visit data, please refer to FIG. 3.

In some embodiments, the node feature includes the customer return visit data, which can adjust push information of the user based on feedback information of the user (e.g., when the user feeds back that a certain gas problem has been solved, the smart gas management platform can stop pushing content related to the gas problem and determine whether to push other gas content based on the return visit data of the user) to obtain a better push effect.

In some embodiments, edges of the gas user association graph may reflect the association relationship between the different gas users. For example, in the first gas user association graph 511, a connecting line connecting different nodes (e.g., node a, node b, etc.) is the edge of the gas user association graph. In some embodiments, nodes with a certain association relationship (e.g., same community, same unit building, etc.) may be connected to each other by the edge. For example, if node a and node b have an association relationship of the same community, then node a and node b may be connected by the edge; if no association relationship exists between node c and node e, then node c and node e are not connected by edges.

In some embodiments, an edge feature of the gas user association graph may include an association attribute of different nodes. The association attribute refers to a correlation degree of the different nodes of the gas user association graph. For example, the association attribute may include a same community, a same unit building, a same gas transmission pipeline, etc.

In some embodiments, the edge of the gas user association graph may also have an edge weights. The edge weight may be determined based on the edge feature. In some embodiments, the smart gas management platform may predetermine in advance that different edge features have different degrees of importance based on experience. For example, the degrees of importance of the different edge features may be expressed by a value such as 1-3. The more important the edge feature, the larger the corresponding value (e.g., the degree of importance of the same unit building is 3, the degree of importance of the same unit building but a different unit building is 2, the degree of importance of the same gas pipeline is 1, etc.). For example, if node a and node b are located in the same community and the same unit building and belong to the same gas pipeline, the edge weight between node a and node b is 3+2+1=6. As another example, if node b and node c belong to the same gas pipeline but not to the same community, the edge weight between node b and node c is 1.

In some embodiments, the node feature may also include a feature of a gas community to which the node belongs.

The gas community to which the node belongs refers to a push community sub-region to which the gas user belongs. As shown in FIG. 5B, the gas community to which the gas user corresponding to node a belongs may be a first push community sub-region 512-1.

The push community sub-region refers to a region consisting of gas users having similar demand information (e.g., all needing gas stove repair services, etc.) and having certain association relationships (e.g., same community, same gas pipeline, etc.). As shown in FIG. 5B, the gas user association graph may be divided into one or more push community sub-regions. For example, the gas user association graph may be divided into the first push community subregion 512-1, a second push community subregion 512-2, etc. For more descriptions about determining the push community sub-region, please refer to the below.

The feature of the gas community to which the node belongs is a feature that reflects an association degree (e.g., belonging to the same community, with similar demand information, etc.) of a plurality of gas users. Exemplarily, as shown in FIG. 5B, nodes a, b, and e belong to the first push community sub-region 512-1, then the gas users corresponding to nodes a, b, and e have the same feature of the gas community to which they belong, and the feature of the gas community to which they belong may be represented as $m_1$.

In some embodiments, the gas users belonging to the same push community sub-region have the same feature of the gas community to which the gas users belong. The same push community sub-region means that the gas users belong to the same push community sub-region. For example, gas users a, b, and e all belong to the first push community sub-region 512-1.

In some embodiments, the one or more push community sub-regions of the gas user association graph may be determined by a clustering manner. In some embodiments, the smart gas management platform may randomly select a plurality of nodes in the gas user association graph as clustering centers and cluster the gas user nodes in the gas user association graph by clustering feature vectors.

In some embodiments, the clustering feature vectors may be constructed based on the node features. Elements in the clustering feature vectors may correspond to the demand information and the edge features (i.e., converting the edge features of the gas user association graph to the node features, for example, the edge features of gas user a and gas user b are belonging to the same community, which after conversion to the node features may be represented as: gas user a is located in community p and gas user b is located in community p) of the gas users.

In some embodiments, the smart gas management platform may process the clustering feature vectors of the nodes in the gas user association graph by a clustering algorithm to obtain one or more clustering results consisting of a plurality of nodes; and use the one or more clustering results as the one or more push community sub-regions of the gas user association graph. The clustering algorithm may include a plurality of algorithm, such as a K-Means clustering, a Density-Based Spatial Clustering of Applications with Noise (DBSCAN), etc.

In some embodiments, the smart gas management platform may determine the one or more push community sub-regions based on the gas user association graph, including: determining the one or more push community sub-regions by a preset algorithm based on the gas user association graph. The preset algorithm includes performing a plurality of rounds of iteration. Each round of iteration of the plurality of rounds of iteration includes: determining the one or more push community sub-regions to which one or more gas user nodes in the gas user association graph belong.

In some embodiments, at least one round of iteration of the plurality of rounds of iteration includes: calculating an increment of a community association degree; determining, based on the increment of the community association degree, the one or more push community sub-regions to which the one or more gas user nodes in the gas user association graph belong. The community association degree is related to a graph complexity of the gas user association graph and connection between the one or more gas user nodes.

The community association degree is a measure of a classification quality of the gas user association graph. In some embodiments, the larger the value of the community association degree of a node, the greater the association degree of the node with other nodes within the same push community sub-region to which the node belongs, and the more accurate the feature of the gas community to which the node corresponding to a gas user belongs.

The graph complexity of the gas user association graph refers to a complexity of the gas user association graph. In some embodiments, the graph complexity of the gas user association graph may be determined based on a count of edges in the graph. For example, the more edges in the gas user association graph, the greater the graph complexity. The connection between the gas user nodes refers to connection between different nodes in the gas user association graph. For example, the connection between the gas user nodes may be whether two nodes are connected to each other, whether two nodes belong to the same push community sub-region, etc.

In some embodiments, the community association degree Q may be determined based on the following equation (1).

$$Q = \frac{1}{2m} \sum_{i,j} \left( a_{ij} - \frac{k_i k_j}{2m} \right) \delta(\gamma_i, \gamma_j) \qquad (1)$$

where m represents the count of edges in the gas user association graph; i and j represent node identifiers, respectively; $a_{ij}$ represents an element of an adjacency matrix in the gas user association graph, and the adjacency matrix is used to represent an adjacent relationship between nodes, where when node i is adjacent to node j (i.e., there exists an edge connecting node i and node j), $a_{ij}=1$, otherwise $a_{ij}=0$; $k_i$ and $k_j$ represent degrees of node i and node j, respectively, where the degree of a node is a count of edges associated with that node (e.g., the degree of node a in the first gas user association graph 511 is 1 and the degree of node b is 4); $\gamma_i$ and $\gamma_j$ represent push community sub-regions to which node i and node j belong, respectively; the function $\delta(\gamma_i, \gamma_j)$ represents whether the push community sub-regions to which node i and node j belong are the same, i.e., when $\gamma_i=\gamma_j$, $\delta(\gamma_i, \gamma_j)=1$, otherwise $\delta(\gamma_i, \gamma_j)=0$.

In some embodiments, the smart gas management platform may determine the push community sub-regions to which the one or more gas user nodes in the gas user association graph belong based on the following operations.

In step 1, all nodes in the gas user association graph are considered as an independent push community sub-region, and an initial count of push community sub-regions is the same as a count of nodes.

In step 2, for any node (e.g., node i) in the gas user association graph, the node i is sequentially assigned to a push community sub-region corresponding to an adjacent node (i.e., node i and the adjacent node are divided into the same push community sub-region), and a community association degree $Q_1$ before the assignment and a community association degree $Q_2$ after the assignment are calculated to obtain a increment $\Delta Q=Q_1-Q_2$ of the community association degree; node i is assigned to the adjacent node when $\Delta Q>0$ and the $\Delta Q$ is maximum. If the $\Delta Q$ corresponding to a plurality of adjacent nodes of node i are smaller than or equal to 0, node i remains unchanged (i.e., node i is not assigned to other push community sub-regions).

In step 3, the operation 2 is repeated until the push community sub-regions to which all nodes belong no longer change (i.e., all nodes cannot be assigned to other push community sub-regions).

In step 4, graph compression is performed on the result obtained in the operation 3, i.e., nodes belonging to the same push community sub-region are compressed into a new node (i.e., the push community sub-region, such as the first push community sub-region 512-1, the second push community sub-region 512-2, etc. in FIG. 5B), the edge weight between different new nodes is equal to a sum of the edge weights between the new nodes. An edge to the new node itself is added to each new node (e.g., the edge 513-1 and the edge 513-2 in FIG. 5B). The weight of the edge is the sum of edge weights between the original nodes within the new node; and the operations 1 to 3 are repeated.

Exemplarily, as shown in FIG. 5B, nodes a, b, and e belonging to the same push community sub-region are compressed into a new node (i.e., the first push community sub-region 512-1) and nodes c, d, and f are compressed into a new node (i.e., the second push community sub-region 512-2), respectively. The weight of the edge connecting the first push community subregion 512-1 to itself (i.e., the edge 513-1) is the sum of the weight of the edge connecting nodes a and b (assuming the weight is 5) and the weight of the edge connecting nodes b and e (assuming the weight is 3), i.e., the weight of the edge 513-1 is 8. Similarly, the weight of the edge 513-2 is obtained. The weight of the edge connecting the first push community subregion 512-1 and the second push community subregion 512-2 is the sum of the weight of the edge connecting nodes b and c (assuming the weight is 1) and the weight of the edge connecting nodes b and f (assuming the weight is 1), i.e., the weight of the edge between the first push community sub-region 512-1 and the second push community sub-region 512-2 is 2.

In step 5, the operation 4 is repeated (i.e., the graph compression is performed several times) until the community association degree of the entire gas user association graph no longer changes, and the new nodes obtained by the compression are used as the one or more push community sub-regions to which the nodes in the gas user association graph belong.

In some embodiments, the community association degree may also be related to a connection weight. The connection weight refers to a weight of a demand for a gas product and a gas service determined based on a similarity of demand matching degrees of different nodes in the gas user association graph. The closer the demand matching degrees of nodes, the greater the connection weight between the nodes. The maximum connection weight is 1. The equation (2) for calculating the community association degree related to the connection weight is as follows.

$$Q = \frac{1}{2m}\sum_{i,j} w_{ij}\left(a_{ij} - \frac{k_i k_j}{2m}\right)\delta(\gamma_i, \gamma_j) \quad (2)$$

where $w_{ij}$ represents the connection weight between node i and node j. The closer the demand matching degrees of node i and node j, the larger the value of $w_{ij}$. The meaning of the remaining letters can be found in the corresponding description at equation (1).

In some embodiments, the push community sub-region is determined based on the community association degree, which can make the nodes in the push community sub-region have a higher association degree, and the obtained features of the gas community to which the nodes belong are more in line with the actual situation of the users. The community association degree is related to the connection weight, which can further improve the accuracy of the divided push community sub-region.

In some embodiments, the feature of the gas community to which the node belongs in the gas user association graph may be determined by: determining, based on the gas user association graph, one or more push community sub-regions; and determining the feature of the gas community to which the node belongs based on the one or more push community sub-regions.

For example, the smart gas management platform may determine each push community sub-region of the gas user association graph based on the above and determine the feature of the gas community to which the gas user node in the gas user association graph belong based on the push community sub-region. For example, gas user a, gas user b, and gas user e belong to the first push community sub-region 512-1, and the feature of the gas community to which they belong may be represented as $m_1$; gas user c, gas user d, and gas user f belong to the second push community sub-region 512-2, and the feature of the gas community to which they belong may be represented as $m_2$, etc.

In some embodiments, the node feature of the gas user node in the gas user association graph includes the feature of the gas community to which the node belongs, which can make it possible for users with similar gas demands to obtain similar gas operation push features and facilitate pushing corresponding gas products and services to the gas users to obtain better push results.

In step 520, determining the gas operation push feature based on the gas user association graph.

In some embodiments, the gas operation push feature may be determined by processing the gas user association graph based on a graph neural network (GNN) model. For example, the smart gas management platform may input the gas user association graph into the GNN model and output the gas operation push feature corresponding to each node. In some embodiments, the graph neural network model may be trained based on a large number of third training samples with labels. Specifically, the third training samples with labels are input into the graph neural network model, and the trained graph neural network model is obtained by updating parameters of the graph neural network model through training until a preset condition is met. The preset condition may include that a loss function is smaller than a threshold, converges, or a training period reaches a threshold. In some embodiments, the third training samples may be a large number of historical gas user association graphs, and the label of the third training sample may be a historical gas operation push feature of each node in the historical gas user association graph. In some embodiments, the third training sample and the label may be obtained based on historical data from the call center and the smart gas data center.

In some embodiments, the gas user association graph is constructed based on the demand information of the different types of users, and the gas operation push feature is further determined based on the gas user association graph, which can make the gas product and gas service pushed to the user more in line with the user demand.

Having thus described the basic concepts, it may be rather apparent to those skilled in the art after reading this detailed disclosure that the foregoing detailed disclosure is intended to be presented by way of example only and is not limiting. Although not explicitly stated here, those skilled in the art may make various modifications, improvements and amendments to the present disclosure. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various parts of this specification are not necessarily all referring to the same embodiment. In addition, some features, structures, or features in the present disclosure of one or more embodiments may be appropriately combined.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that the present disclosure object requires more features than the features mentioned in the claims. Rather, claimed subject matter may lie in less than all features of a single foregoing disclosed embodiment.

In some embodiments, the numbers expressing quantities or properties used to describe and claim certain embodiments of the present disclosure are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the present disclosure disclosed herein are illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A method for gas operation based on a call center of smart gas, implemented by a smart gas management platform of an Internet of Things system for gas operation based on a call center of smart gas, comprising:
   obtaining call data of a gas user of a call center;
   predicting demand information of different types of users based on the call data of the gas user, respectively, the demand information at least including a gas product demand and a gas service demand; and
   determining a gas operation push feature and pushing the gas operation push feature based on the demand information of the different types of users, the gas operation push feature including a push type feature and a push content feature.

2. The method of claim 1, wherein the Internet of Things system for gas operation based on a call center of smart gas includes a smart gas user platform, a smart gas service platform, the smart gas management platform, a smart gas sensing network platform, and a smart gas object platform;
   the smart gas user platform is used to: send the call data of the gas user to the smart gas service platform and receive customer service feedback information uploaded by the smart gas service platform; and send a gas operation and management information query instruction to the smart gas service platform and receive gas maintenance and management information uploaded by the smart gas service platform;
   the smart gas service platform is used to: send the gas operation and management information query instruction to the smart gas management platform and receive the gas operation and management information uploaded by the smart gas management platform; and receive the gas operation and management information query instruction sent by the smart gas user platform and upload the gas operation and management information to the smart gas user platform;
   the smart gas management platform is used to: send an instruction for obtaining data related to a gas device to the smart gas sensing network platform and receive the data related to the gas device uploaded by the smart gas sensing network platform; and receive the gas operation and management information query instruction sent by the smart gas service platform and upload the gas operation and management information to the smart gas service platform;
   the smart gas sensing network platform is used to: receive the data related to the gas device uploaded by the smart gas object platform and send the instruction for obtaining the data related to the gas device to the smart gas object platform; and receive the instruction for obtaining the data related to the gas device sent by the smart gas management platform and upload the data related to the gas device to the smart gas management platform; and
   the smart gas object platform is used to: receive the instruction for obtaining the data related to the gas device sent by the smart gas sensing network platform and upload the data related to the gas device to the smart gas sensing network platform.

3. The method of claim 1, wherein the predicting demand information of different types of users based on the call data of the gas user, respectively includes:
   classifying the call data of the gas user;
   determining, based on different types of call data of the gas user, demand matching degrees of the gas user for different demands; and predicting the demand information of the different types of users based on the demand matching degrees.

4. The method of claim 3, wherein the demand matching degree is determined by processing the call data of the gas user of the different types of users using a matching model; and the matching model is a machine learning model and the matching model includes a feature extraction layer and a determination layer.

5. The method of claim 3, wherein the predicting the demand information of the different types of users based on the demand matching degrees includes:
determining at least one demand corresponding to the demand matching degree of the gas user meeting a preset condition; and
in response to a determination that the at least one demand has customer return visit data corresponding to the demand, predicting the demand information of the different types of users in combination with the customer return visit data.

6. The method of claim 1, wherein the method further includes:
predicting, based on the demand information of the different types of users, quantity demanded information on a gas product and a gas service; and
determining a stocking scheme through the call center based on the predicted quantity demanded information.

7. The method of claim 6, wherein the prediction of the quantity demanded information is related to a demand matching degree.

8. The method of claim 6, wherein the quantity demanded information is predicted by processing the demand information of the different types of users and the gas operation push feature using a quantity demanded prediction model; and the quantity demanded prediction model is a machine learning model and the quantity demanded prediction model includes an embedding layer and a demand prediction layer.

9. The method of claim 1, wherein the determining a gas operation push feature and pushing the gas operation push feature based on the demand information of the different types of users includes:
constructing, based on the demand information of the different types of users, a gas user association graph, the gas user association graph including a node and an edge, the node including a gas user node, and the edge including an association attribute between the gas users; and
determining the gas operation push feature based on the gas user association graph.

10. The method of claim 9, wherein a node feature of the node includes a demand matching degree of the gas user and the demand matching degree is determined based on a matching model.

11. The method of claim 9, wherein a node feature of the node further includes customer return visit data.

12. The method of claim 9, wherein a node feature of the node includes a feature of a gas community to which the node belongs and determining the feature of the gas community to which the node belongs includes:
determining, based on the gas user association graph, one or more push community sub-regions; and
determining the feature of the gas community to which the node belongs based on the one or more push community sub-regions.

13. The method of claim 12, wherein the determining, based on the gas user association graph, one or more push community sub-regions includes:

determining the one or more push community sub-regions by a preset algorithm, the preset algorithm including performing a plurality of rounds of iteration, wherein each round of iteration of the plurality of rounds of iteration includes:
determining the one or more push community sub-regions to which one or more gas user nodes in the gas user association graph belong.

14. The method of claim 13, wherein at least one round of iteration of the plurality of rounds of iteration includes:
calculating an increment of a community association degree; determining, based on the increment of the community association degree, the one or more push community sub-regions to which the one or more gas user nodes in the gas user association graph belong, the community association degree being related to a graph complexity of the gas user association graph and connection between the one or more gas user nodes.

15. The method of claim 14, wherein the community association degree is related to a connection weight and the connection weight is related to a demand matching degree.

16. An Internet of Things system for gas operation based on a call center of smart gas, wherein a smart gas management platform of the Internet of Things system for gas operation based on a call center of smart gas is configured to:
obtain call data of a gas user of a call center;
predict demand information of different types of users based on the call data of the gas user, respectively, the demand information at least including a gas product demand and a gas service demand; and
determine a gas operation push feature and push the gas operation push feature based on the demand information of the different types of users, the gas operation push feature including a push type feature and a push content feature.

17. The Internet of Things system of claim 16, wherein the Internet of Things system for gas operation based on a call center of smart gas includes a smart gas user platform, a smart gas service platform, the smart gas management platform, a smart gas sensing network platform, and a smart gas object platform;
the smart gas user platform is used to: send the call data of the gas user to the smart gas service platform and receive customer service feedback information uploaded by the smart gas service platform; and send a gas operation and management information query instruction to the smart gas service platform and receive gas maintenance and management information uploaded by the smart gas service platform;
the smart gas service platform is used to: send the gas operation and management information query instruction to the smart gas management platform and receive the gas operation and management information uploaded by the smart gas management platform; and receive the gas operation and management information query instruction sent by the smart gas user platform and upload the gas operation and management information to the smart gas user platform;
the smart gas management platform is used to: send an instruction for obtaining data related to a gas device to the smart gas sensing network platform and receive the data related to the gas device uploaded by the smart gas sensing network platform; and receive the gas operation and management information query instruction sent by the smart gas service platform and upload the gas operation and management information to the smart gas service platform;

the smart gas sensing network platform is used to: receive the data related to the gas device uploaded by the smart gas object platform and send the instruction for obtaining the data related to the gas device to the smart gas object platform; and receive the instruction for obtaining the data related to the gas device sent by the smart gas management platform and upload the data related to the gas device to the smart gas management platform; and the smart gas object platform is used to: receive the instruction for obtaining the data related to the gas device sent by the smart gas sensing network platform and upload the data related to the gas device to the smart gas sensing network platform.

18. The Internet of Things system of claim 16, wherein the smart gas management platform is further used to:

classify the call data of the gas user;

determine, based on the call data of the gas user of the different types of users, demand matching degrees of the gas user for different demands; and predict the demand information of the different types of users based on the demand matching degrees.

19. The Internet of Things system of claim 16, wherein the smart gas management platform is further used to:

predict, based on the demand information of the different types of users, quantity demanded information on a gas product and a gas service; and determine a stocking scheme through the call center based on the predicted quantity demanded information.

20. A non-transitory computer-readable storage medium storing computer instructions, wherein when the computer instructions are executed by a processor, the method for gas operation based on a call center of smart gas of claim 1 is implemented.

* * * * *